(12) United States Patent
Langenwalter

(10) Patent No.: US 11,998,774 B2
(45) Date of Patent: Jun. 4, 2024

(54) FACE MASK WITH IMPROVED FACE SEAL

(71) Applicant: Keith Allan Langenwalter, Portland, OR (US)

(72) Inventor: Keith Allan Langenwalter, Portland, OR (US)

(*) Notice: Subject to any disclaimer, the term of this patent is extended or adjusted under 35 U.S.C. 154(b) by 214 days.

(21) Appl. No.: 17/660,399

(22) Filed: Apr. 22, 2022

(65) Prior Publication Data

US 2023/0338755 A1 Oct. 26, 2023

(51) Int. Cl.
*A62B 23/00* (2006.01)
*A41D 13/11* (2006.01)
*A62B 23/02* (2006.01)
*B01D 46/00* (2022.01)

(52) U.S. Cl.
CPC ........ *A62B 23/025* (2013.01); *A41D 13/1161* (2013.01); *B01D 46/0002* (2013.01)

(58) Field of Classification Search
CPC .............. A62B 23/025; A41D 13/1161; B01D 46/0002
See application file for complete search history.

(56) References Cited

U.S. PATENT DOCUMENTS

| | | | | |
|---|---|---|---|---|
| 2,845,927 | A * | 8/1958 | Hill | A62B 23/025 200/8 R |
| 11,241,594 | B2 * | 2/2022 | Szasz | A62B 18/10 |
| 2021/0322796 | A1 * | 10/2021 | Hubbard | B01D 39/083 |
| 2022/0295920 | A1 * | 9/2022 | Van Der Hoeven | A41D 13/1115 |
| 2023/0233886 | A1 * | 7/2023 | Hacking | A62B 18/082 128/201.19 |

* cited by examiner

*Primary Examiner* — Steven O Douglas

(57) ABSTRACT

A reusable face mask with a foam face seal to protect against transmission of airborne pathogens. The face mask uses an easily interchangeable, readily available, non-proprietary, standard filter. It has a section specifically designed to mitigate the fogging of glasses, and has a user-interchangeable strap/harness system.

20 Claims, 11 Drawing Sheets

FACE MASK WITH IMPROVED FACE SEAL

CROSS-REFERENCE TO RELATED APPLICATIONS

Figure 1:
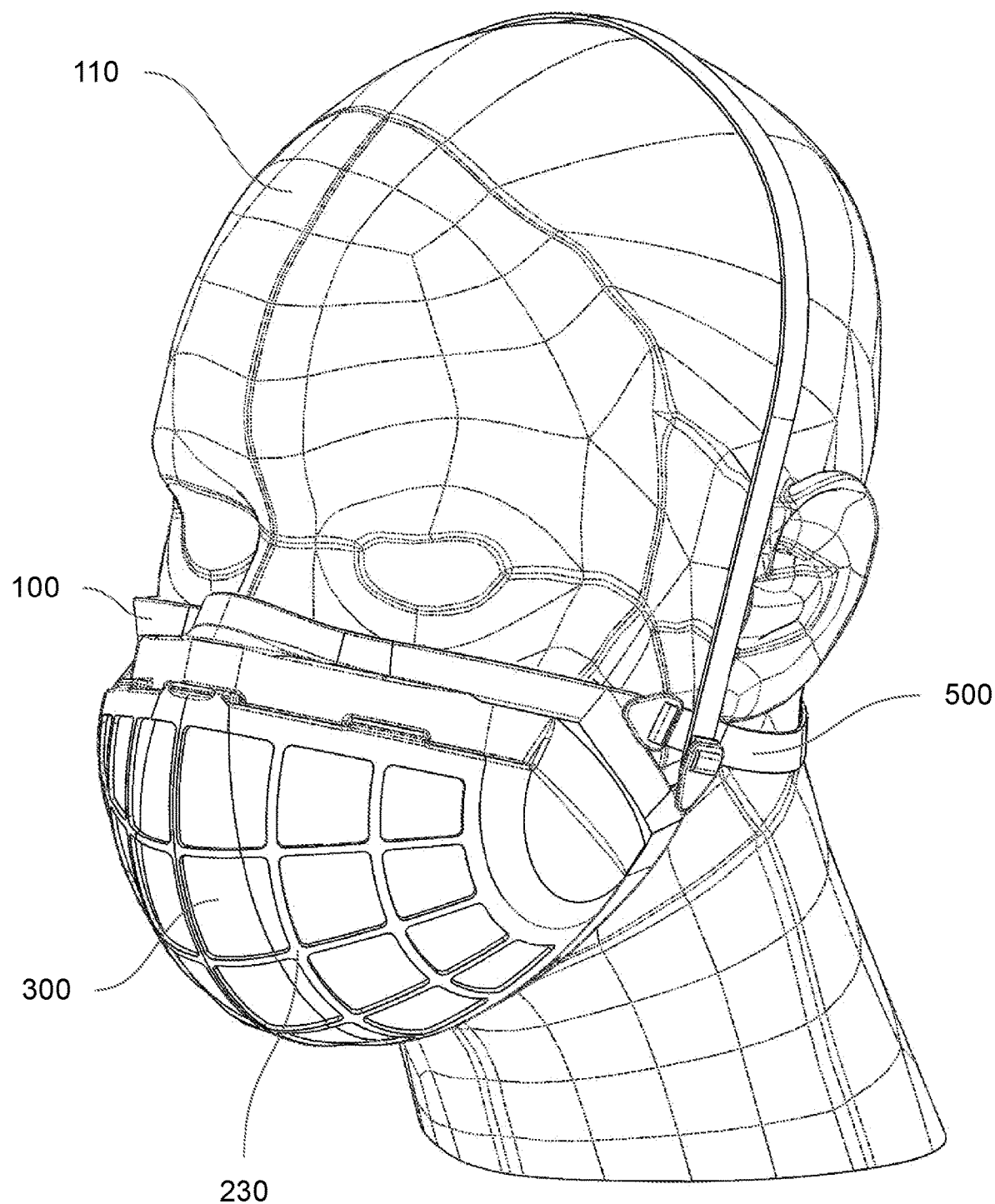

This application claims the benefit of provisional patent application Ser. No. 66/177,958, filed 2021 Apr. 22 by the present inventor.

FEDERALLY SPONSORED RESEARCH

Not applicable

SEQUENCE LISTING OR PROGRAM

Not applicable

BACKGROUND OF THE INVENTION—FIELD OF INVENTION

This invention relates to face masks, specifically to face masks intended to protect the user and those around the user from transmission of airborne pathogens.

BACKGROUND OF THE INVENTION—PRIOR ART

Face masks are worn by users to help prevent transmission of airborne pathogens between the user and other people around the user.

In 1897, Dr Carl Georg Friedrich Wilhelm Flügge of Germany developed the droplet theory of infection. That same year, Dr Jan Mikulicz-Radecki of Poland proposed a single layer of gauze to be worn over the mouth. The following year, in 1898, Dr. W Huebner recommended that surgeons wear masks made from two layers of gauze during operations.

Cloth/gauze masks were worn by doctors and surgeons, and the general public wore them during the H1N1 influenza pandemic of 1918 to 1920 to help prevent transmission of the virus. Modern surgical masks arrived in the 1960s, and N95 masks arrived in the 1970s. The former has superior filtration and deflection, and the latter combines those advantages with a better face seal.

In the present day, there are many options for face coverings, including face masks, face shields, and spit guards. Both face shields and spit guards are relatively ineffective at blocking aerosolized droplets, thus they allow transmission of airborne pathogens between users. Therefore, we shall focus on the face mask.

The main concept of a face mask is to position some kind of filtration media between the user's airway and the outside environment, and to have the user's inhalation/exhalation pass through this media. There are two basic ways for this concept to fail; either the breath goes around the filter rather than through it, or the filter is not sufficient. For example, if you have a great filter but poor face seal, your breath can escape around the filter; alternatively, if you have a great face seal but a poor filter, then aerosolized droplets with pathogens can still get through. Either way, the face mask is not being very effective.

Another issue with face masks that don't seal well against the face is that a user's breath tends to escape up around the nose. If the user wears glasses, such as prescription glasses, sunglasses, or safety glasses, then the user's warm moist breath will fog up the glasses, making it difficult for the user to see.

There are many face masks already on the market. A disposable square pleated mask is very economical and readily available, but they typically don't seal well against the face, and there are many masks of unknown quality available, raising questions about the filtration effectiveness.

A disposable 3-ply square pleated surgical mask must meet specific ASTM standards, so a user can be confident in the filtration effectiveness. They are also relatively inexpensive, however, they still don't seal well against the face.

A fitted disposable N95 is a very effective tool. It has excellent filtration, and each user has tested the fit under a controlled setting to verify that the fit is good. Unfortunately, most people don't have access to a fit test, and the masks are more expensive than a square pleated mask.

A non-fitted disposable N95 still has good filtration, but it may not seal well against the face, and they are more expensive than a square pleated mask.

All of the above options are disposable, so when a user gets a new mask, they are required to fit the mask to their face. Sometimes the fit may be worse, which will yield more air leakage around the filter, reducing the filtration effectiveness.

Another option is a respirator with removable filtration cartridges. These generally have an excellent face seal. Most respirators on the market have two filtration cartridges for the inhaled air, and none for the exhaled air, so half of the benefit of wearing the respirator (protecting others around the user) is eliminated. Respirators are bulky, and communication is difficult, as the user's speech is muffled. Plus, the cartridges are expensive.

Reusable cloth face masks come in many different varieties. The most basic variety is a simple cloth face covering that doesn't seal well or do much filtration. Some add an extra layer or two of material without actually doing much additional filtration.

Some reusable cloth face masks have a washable filter built in—this filter generally has a limited number of wash cycles. Other reusable cloth face masks have a pocket for a removable filter, which is a great solution for environmental reasons—only the filter needs to change, whereas the bulk of the face mask is reusable and washable. However, these are always proprietary filters—a user is generally unable to get a filter of a higher quality, and is locked into buying the specific filter their mask. This can be a problem for a number of reasons; cost, supply chain, availability when traveling or when needed immediately, etc. Also, none of the reusable cloth face masks seal well against the face, so even if there is a filter, a lot of air will pass around the filter rather than through it, mostly around the nose and cheeks up towards the eyes.

Some people have proposed silicone masks that seal well against the face, but are heavy and bulky, and the filters are proprietary with all the disadvantages of a proprietary filter listed above. All of these options generally include a specific set of straps—if a strap breaks, the entire mask needs to be discarded, whether the mask is disposable or reusable. Plus, a user is locked into a particular strap style, be it ear loops or behind the head.

An unrelated product that should be examined are ski goggles. They seal well against the face, due to their construction of a flexible material with a separate face seal, plus some have magnetic lens interchange systems. They are worn all day when skiing, so they are generally comfortable. Ski goggle frames are generally composed of a TPU material, and the face foam is a thick layer of open cell foam. While open cell foam may not be a good application for a face mask, a closed cell foam would be. The lens interchange system could be a good example for both easily changing out a disposable filter, as well as sealing that filter to prevent air leakage around the edges.

Others have come to the conclusion of a reusable mask with a disposable filter and a foam face seal to mitigate the fogging of glasses. US Patent Application 20150360061 (Kalatoor, 2006) describes a mask with nose foam for an improved seal, but the foam is only in the nose region, and the mask is not reusable. U.S. Pat. No. 9,770,611 (Facer et el, 2017) describes a mask with greater airflow resistance in the sinus region to help mitigate the fogging of glasses, but the mask is not reusable. U.S. patent Ser. No. 10/207,129 (Koehler, 2019) describes an unnecessarily complex face seal, without reference to a reusable mask or replaceable, disposable filter. US Patent Application 20180008848 (Moulton et el, 2017) describes a reusable mask with a foam face seal and a replaceable disposable filter, however, there is no specific mitigation for the fogging of glasses, the filter is not a standard filter, and the harness is not interchangeable. EP Patent Application EP3895568 (Banchini, 2021) also describes a reusable mask with a foam face seal and a replaceable disposable filter, however, there is no specific mitigation for the fogging of glasses, the filter is not a standard filter, and the harness is not interchangeable. In addition, the harness is on the outer mask, and the face foam is on the inner mask.

BACKGROUND OF THE INVENTION—OBJECTS AND ADVANTAGES

Accordingly, several objects and advantages of the present invention are:
a) To provide a face mask that is reusable to cut down on long-term expense and reduce environmental impact.
b) To provide a face mask that seals well against the face so all the air exchange is directed through the filter, rather than around it.
c) To provide a face mask that uses easily-interchanged disposable filters that are readily available, so a user never has to worry about not having a good filter.
d) To provide a face mask where the interchangeable filter is held securely in place without any air leakage around the edges of the filter.
e) To provide a face mask that mitigates the fogging of glasses.
f) To provide a face mask that has an interchangeable strap/harness system so a user can switch between ear loops and behind-the-head straps, or some combination of them.

SUMMARY

In accordance with the present invention a reusable face mask with a foam face seal that uses readily available non-proprietary disposable filters, such as a surgical face mask, has features to mitigate the fogging of glasses, and has an interchangeable strap/harness system.

DRAWINGS—FIGURES

Figure 2:
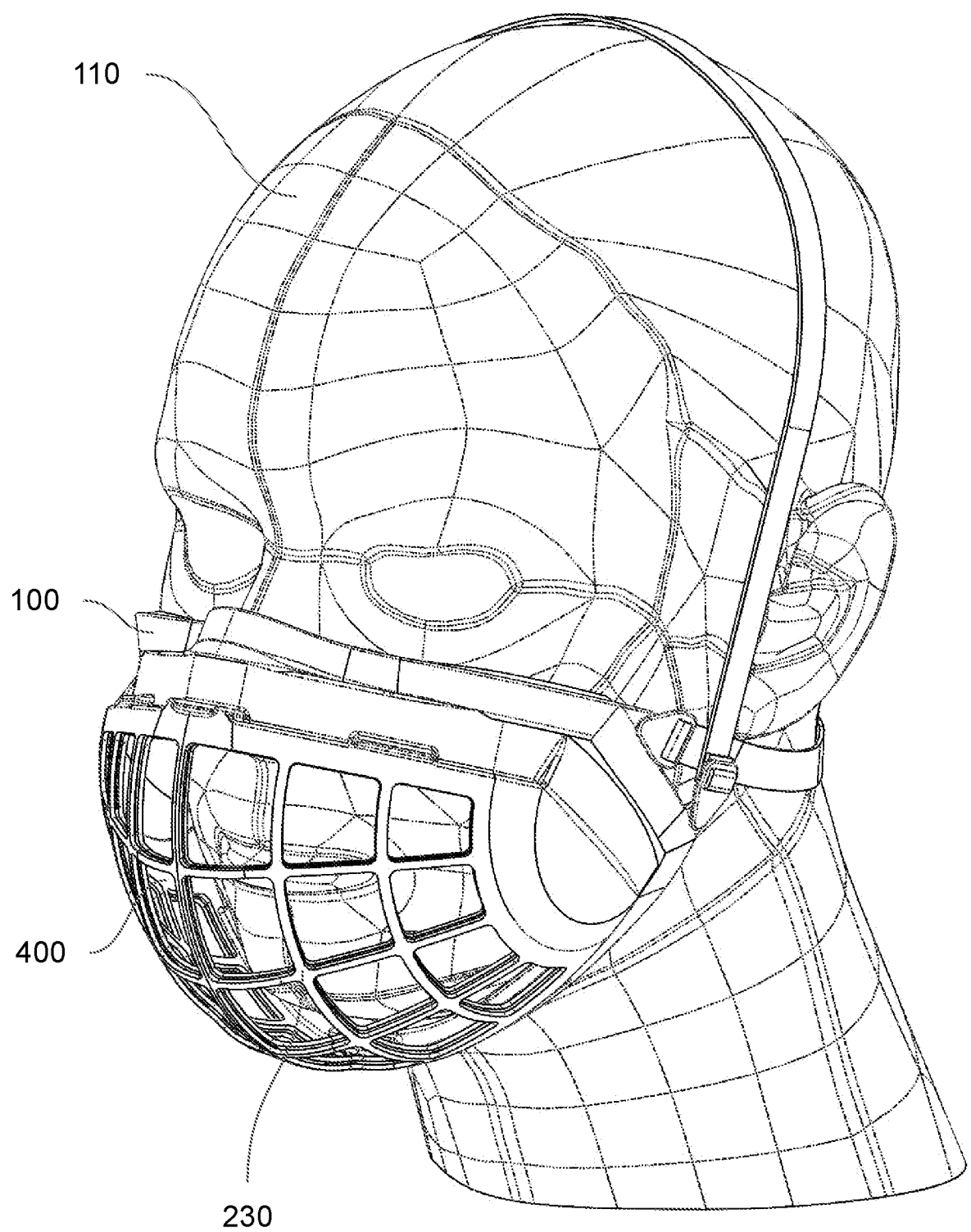
Figure 3A:
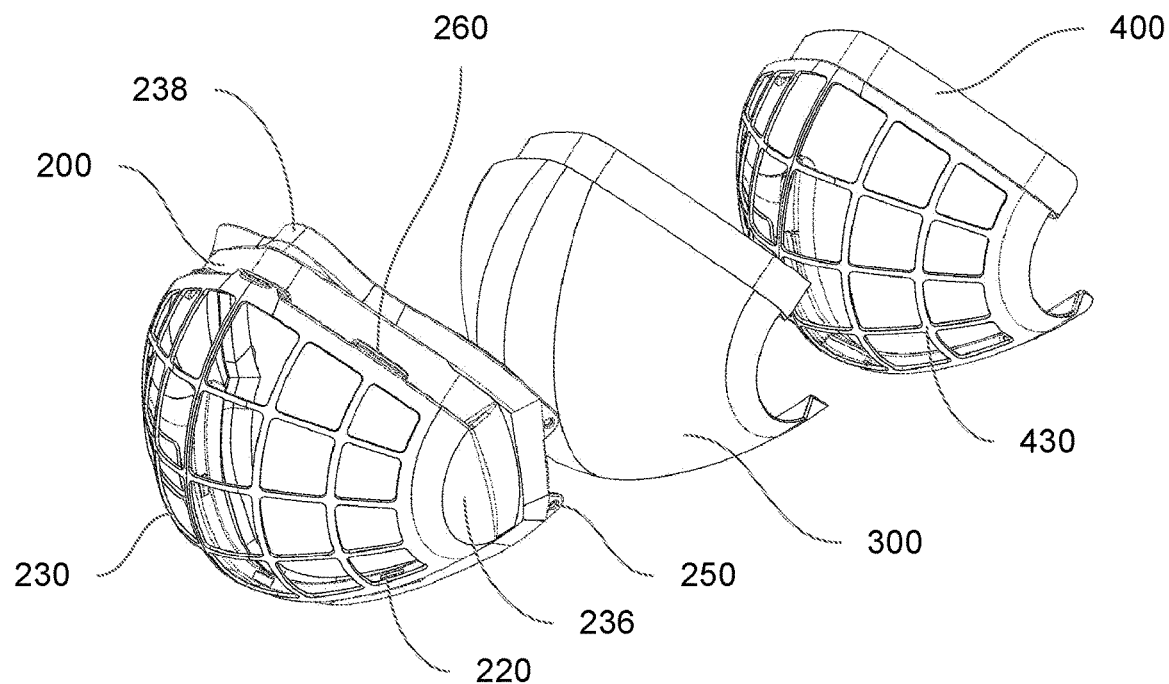
Figure 3B:
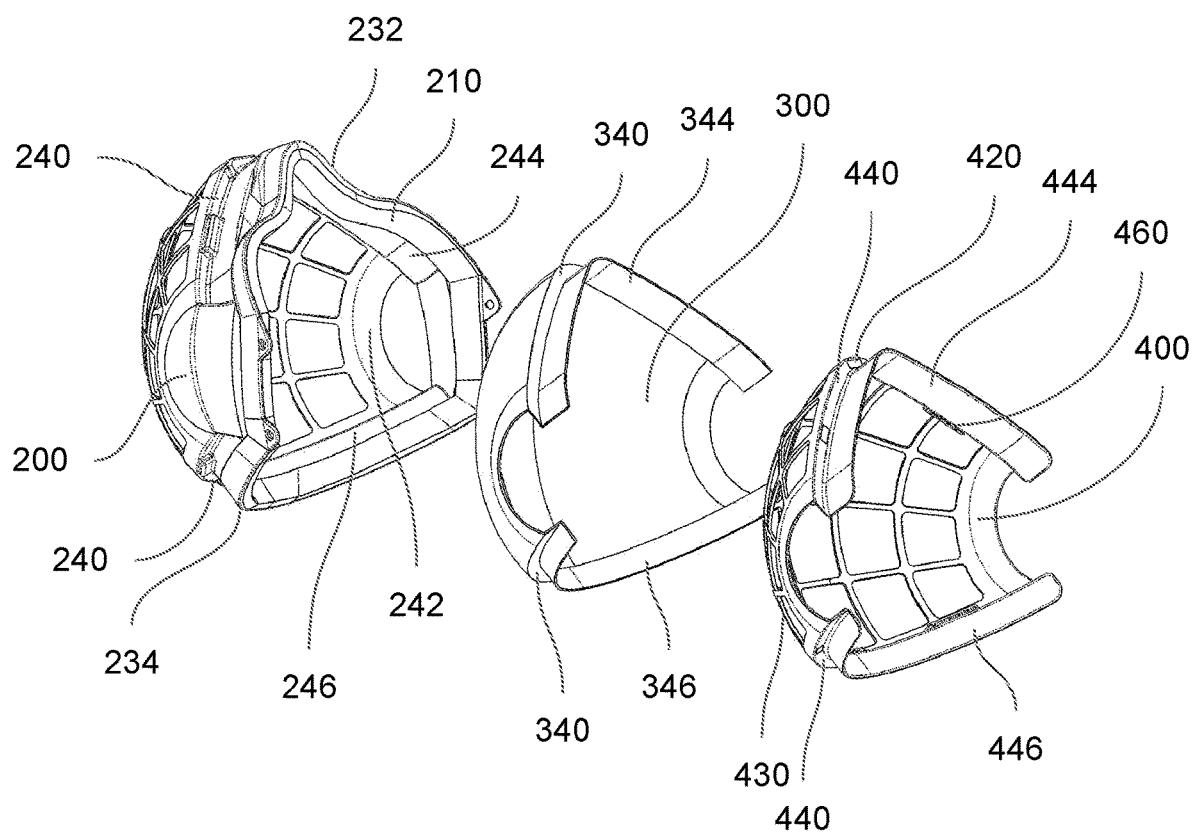
Figure 4A:
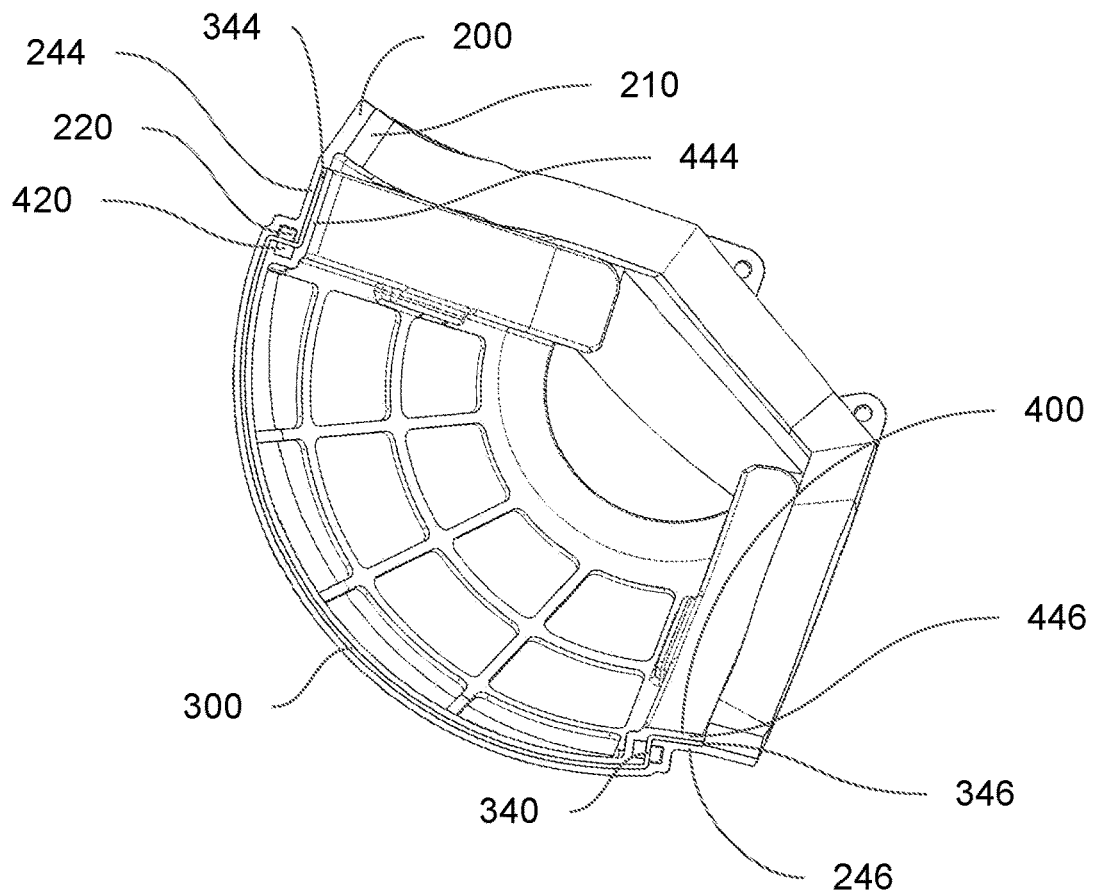
Figure 4B:
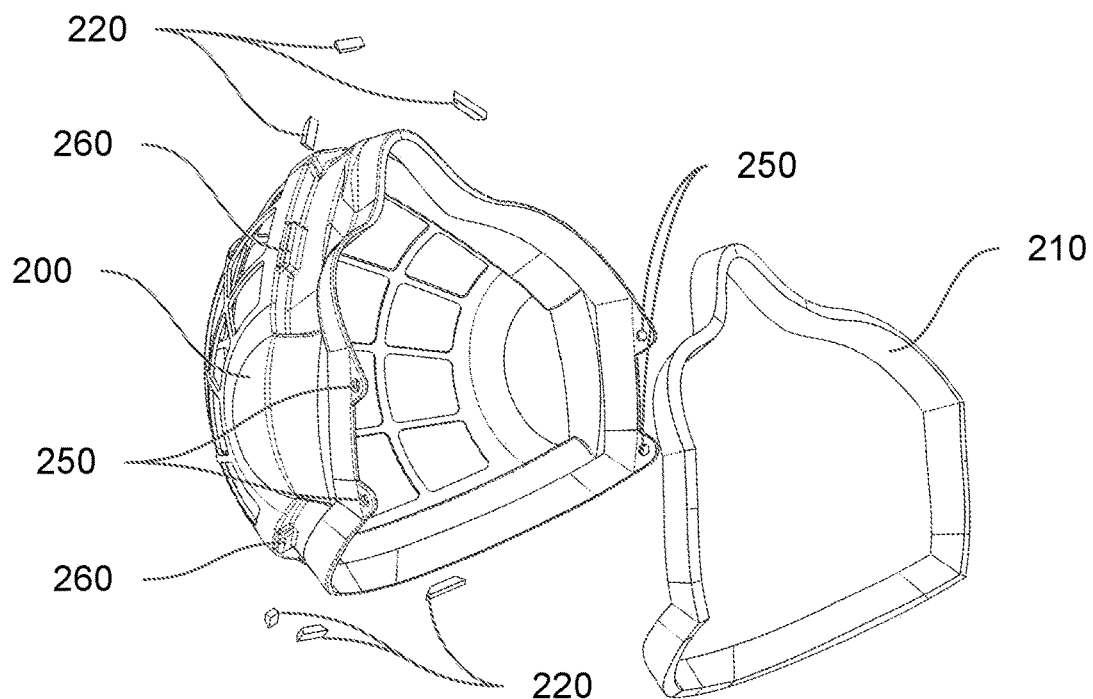
Figure 5:
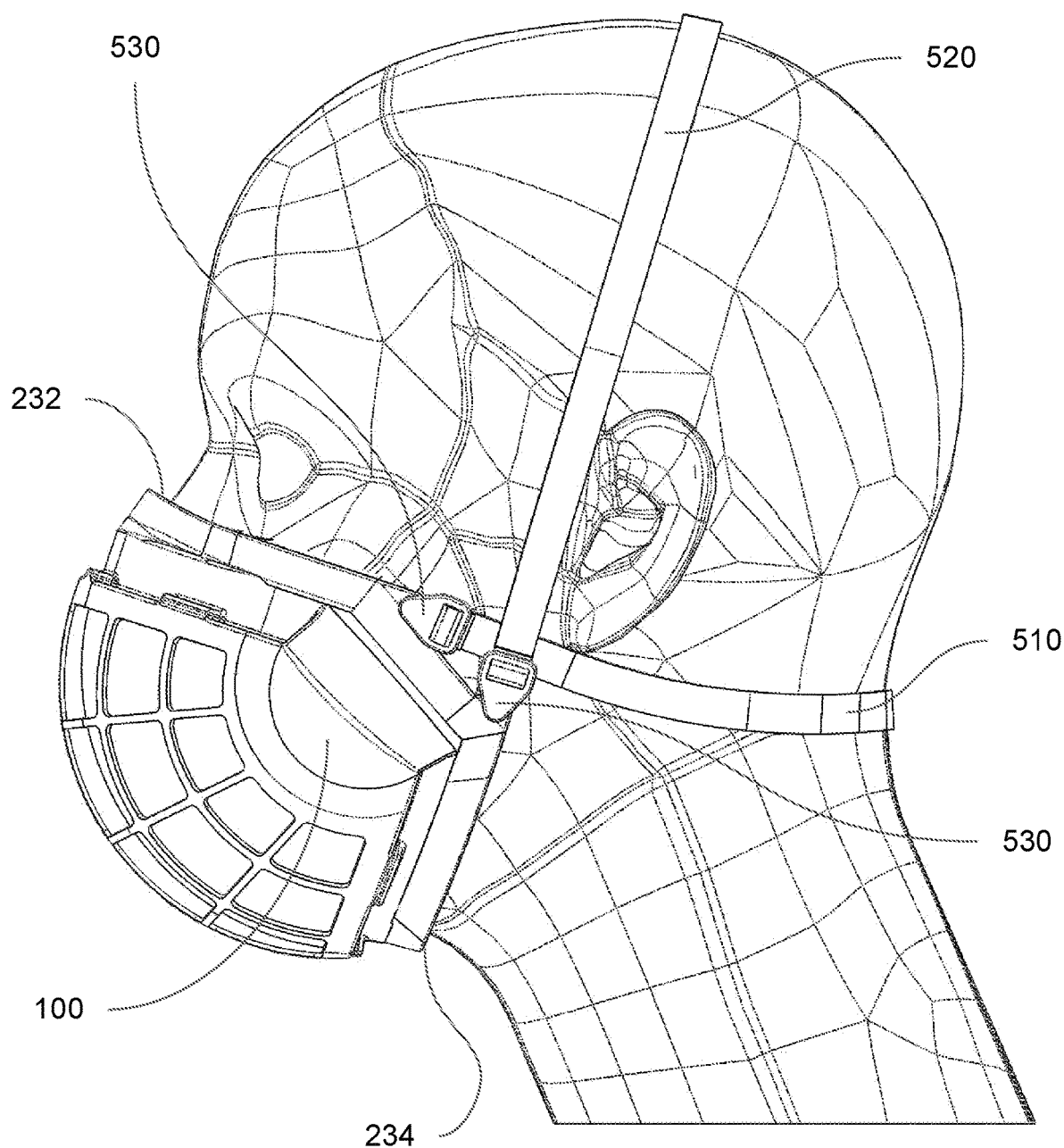
Figure 6:
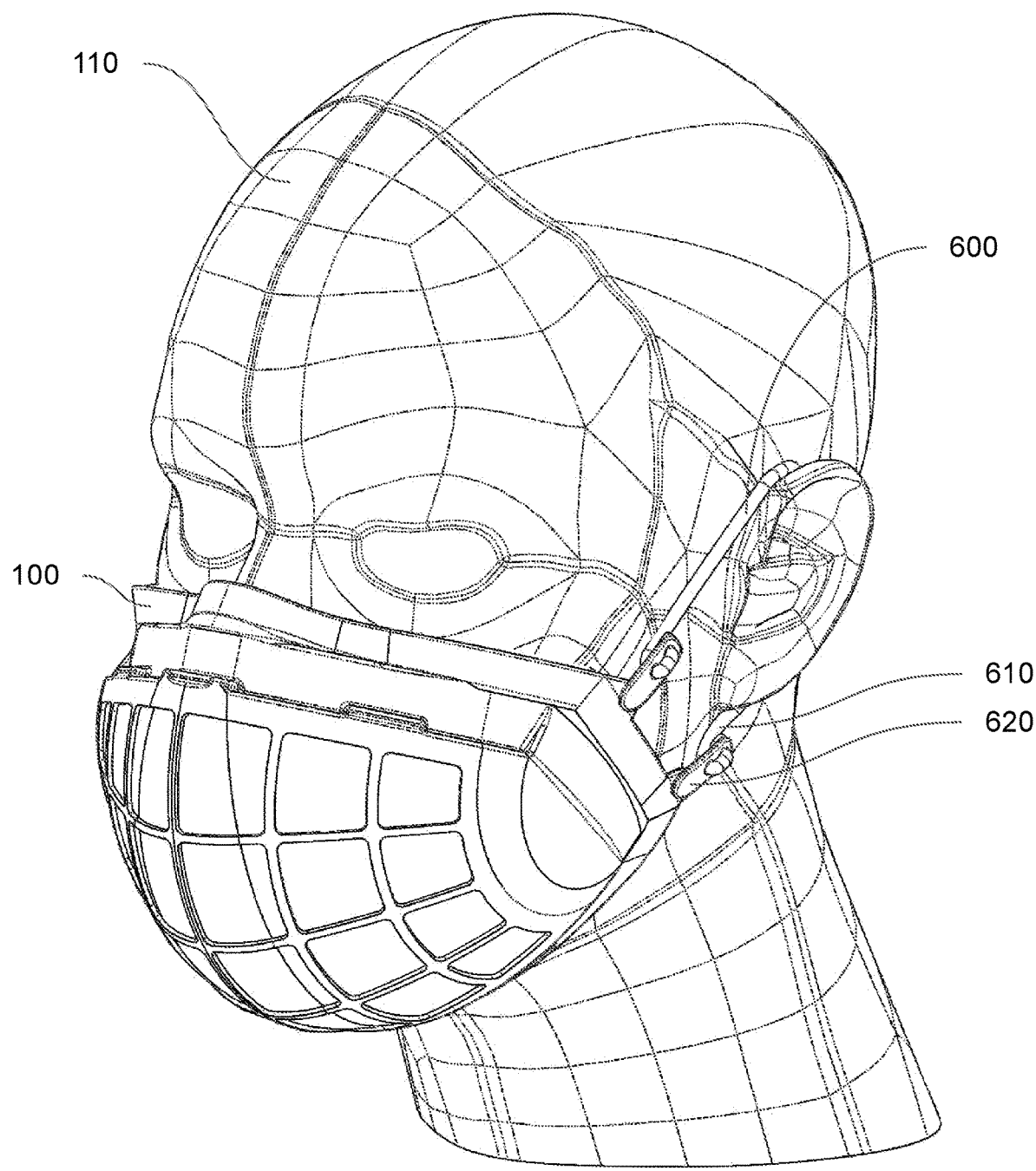
Figure 7:
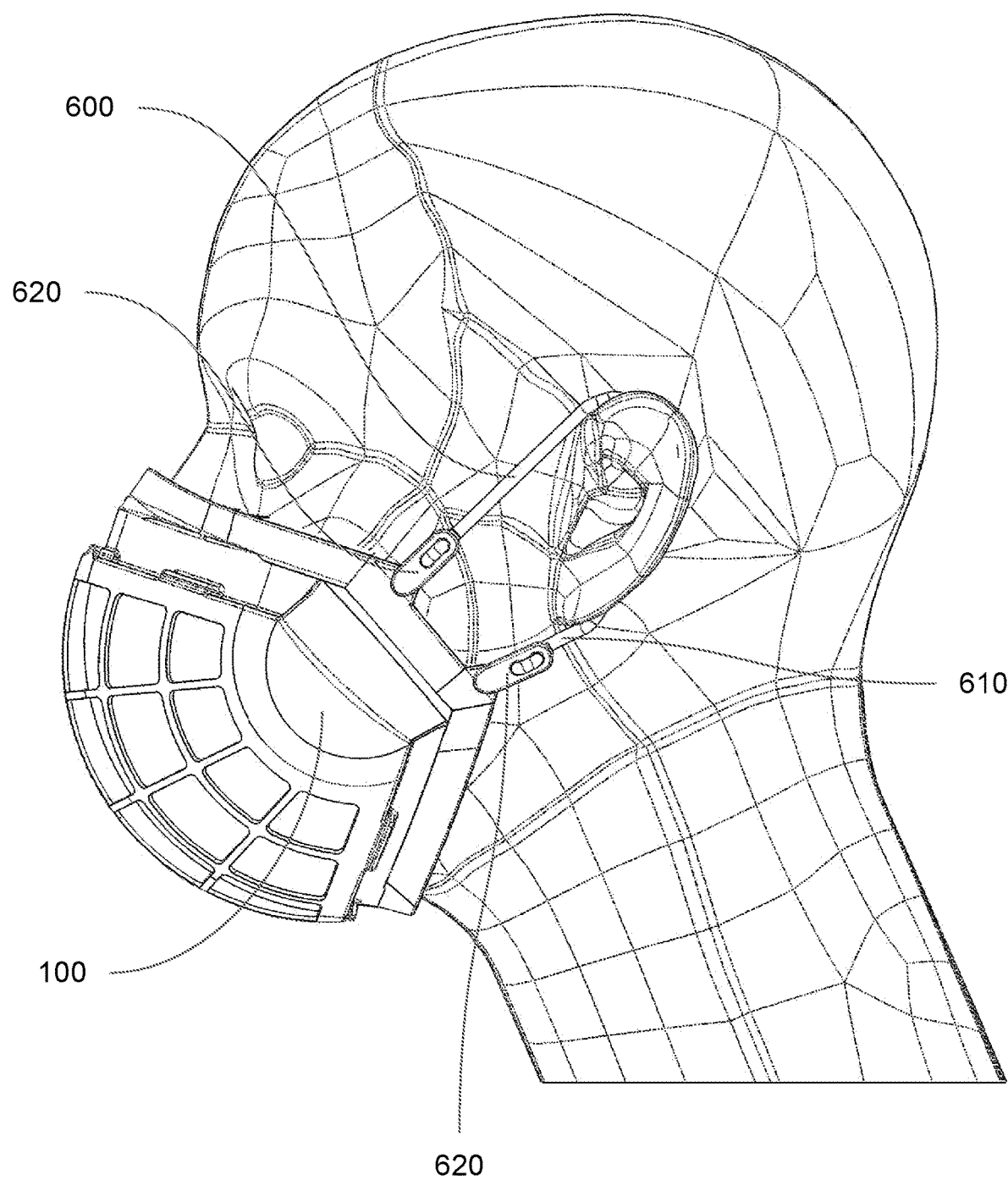
Figure 8A:
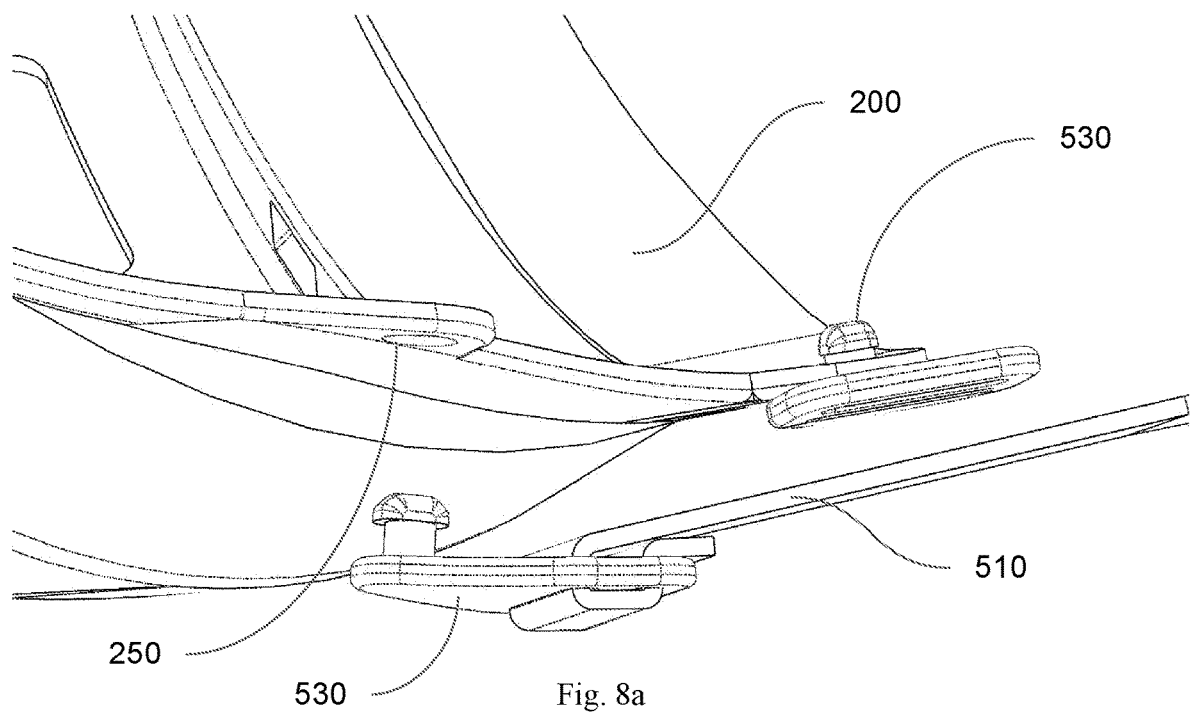
Figure 8B:
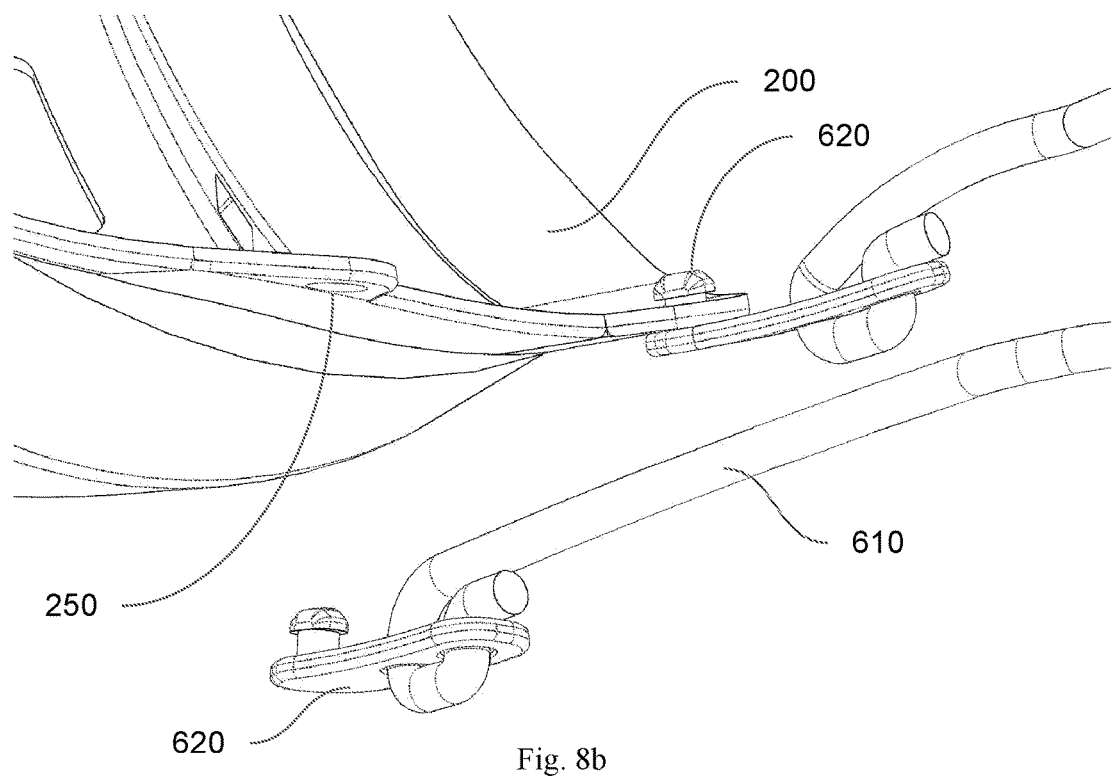
Figure 9:
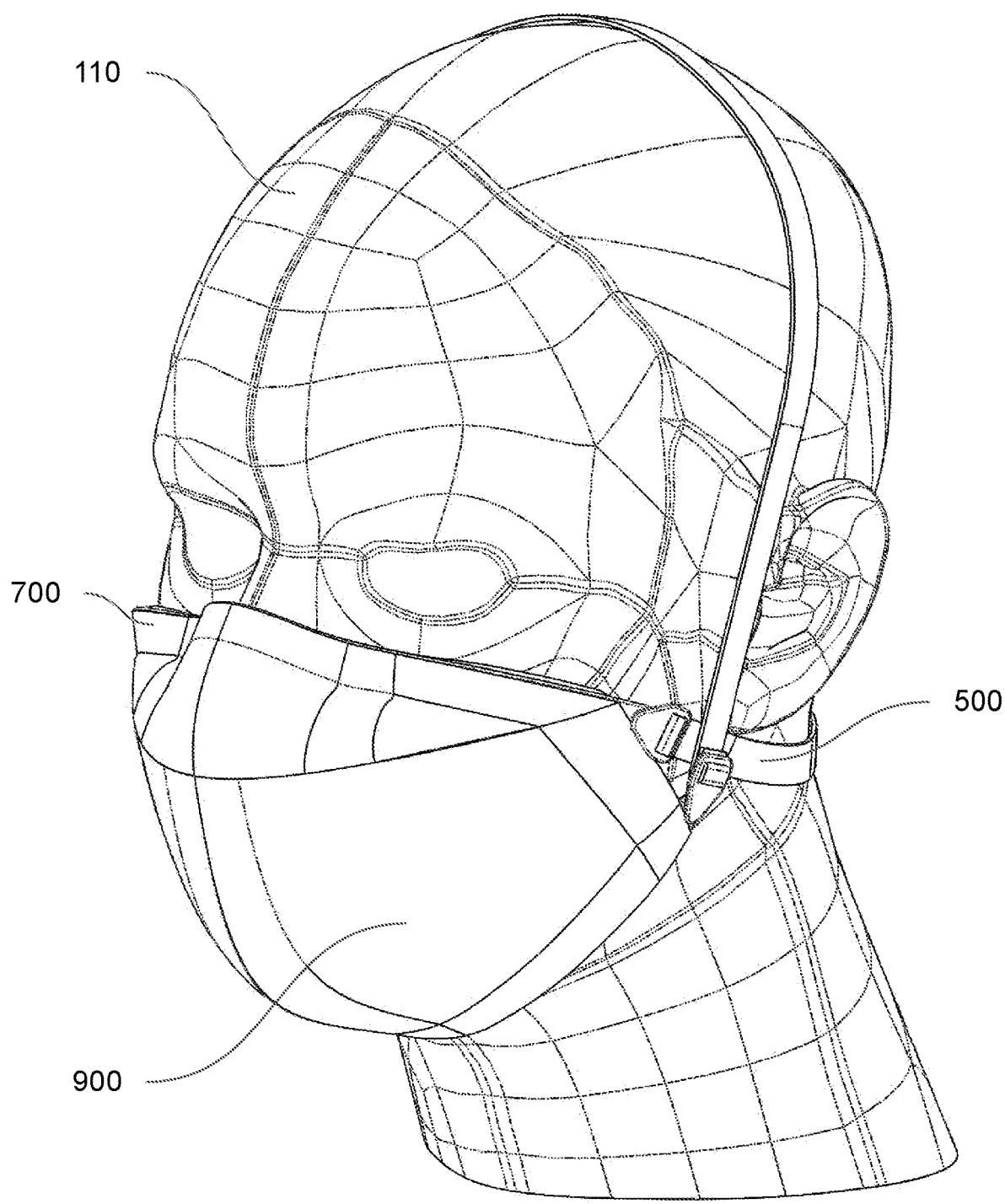
Figure 10A:
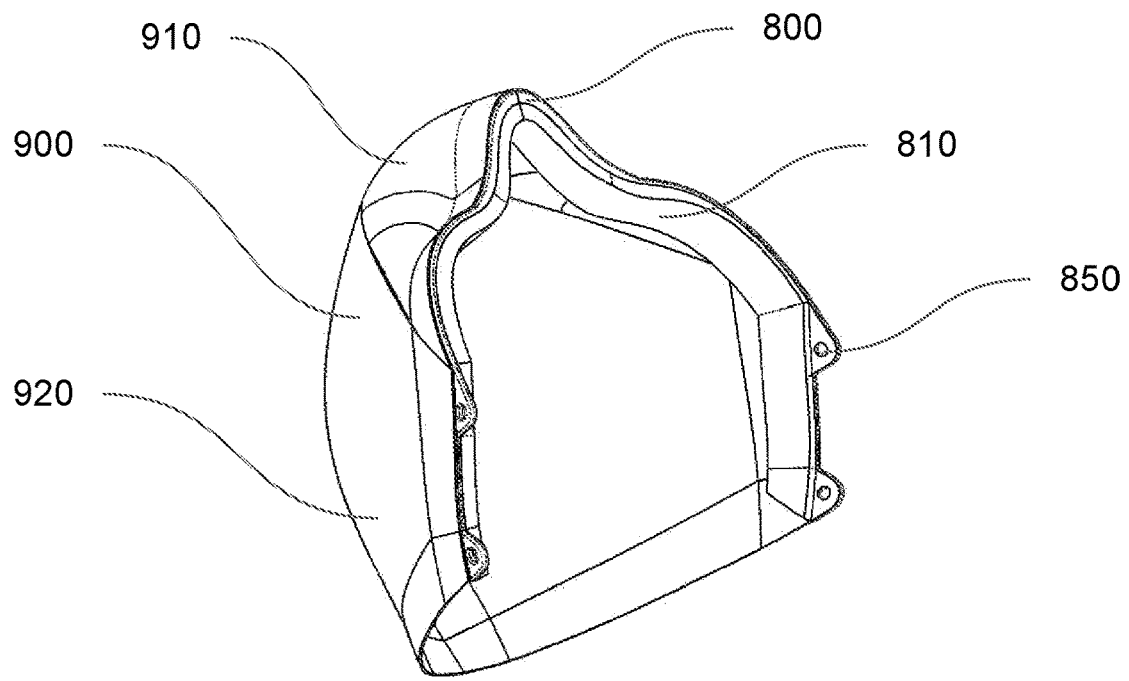
Figure 10B:
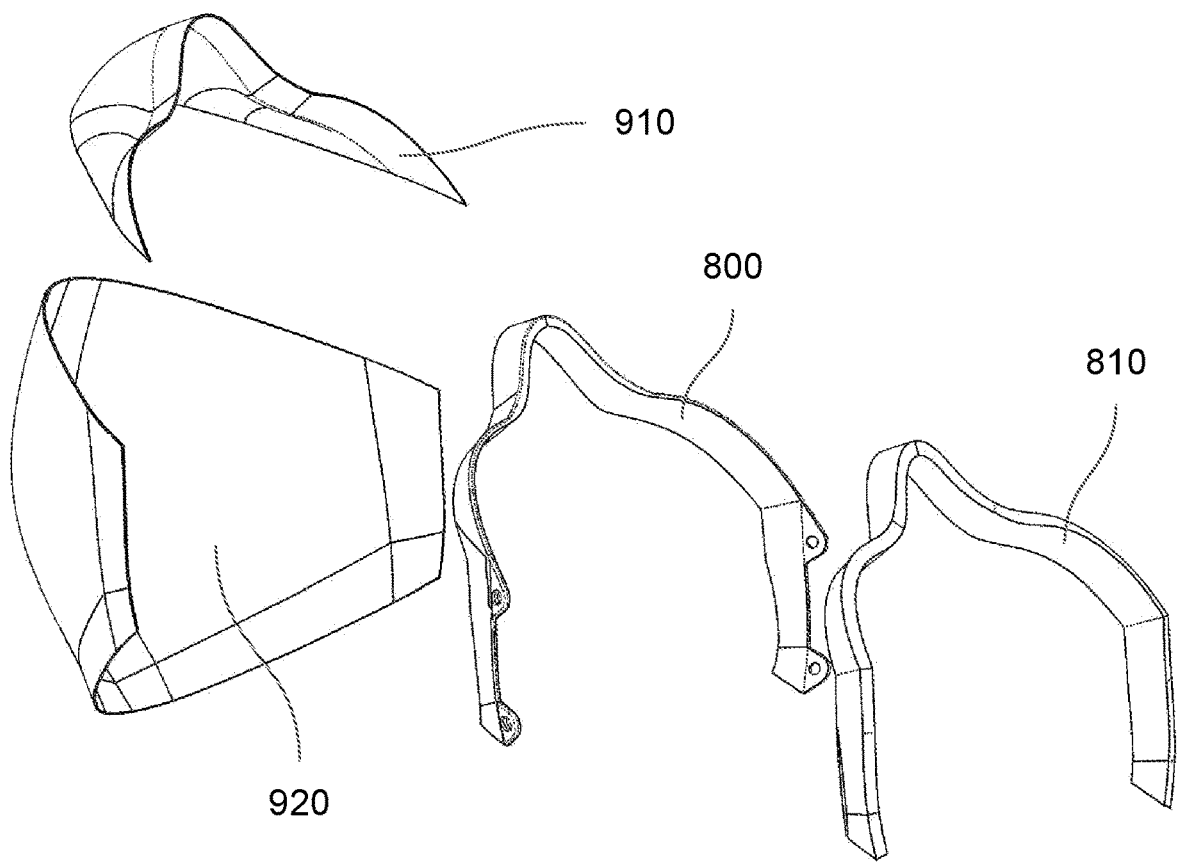
Figure 11A:
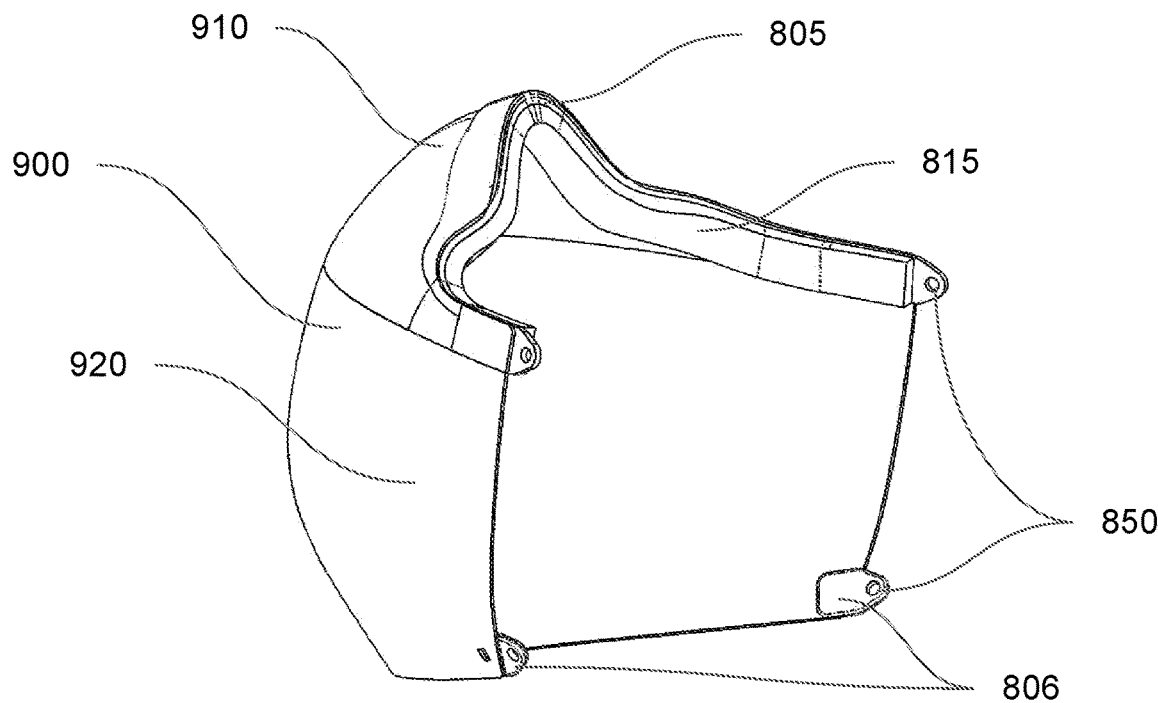
Figure 11B:
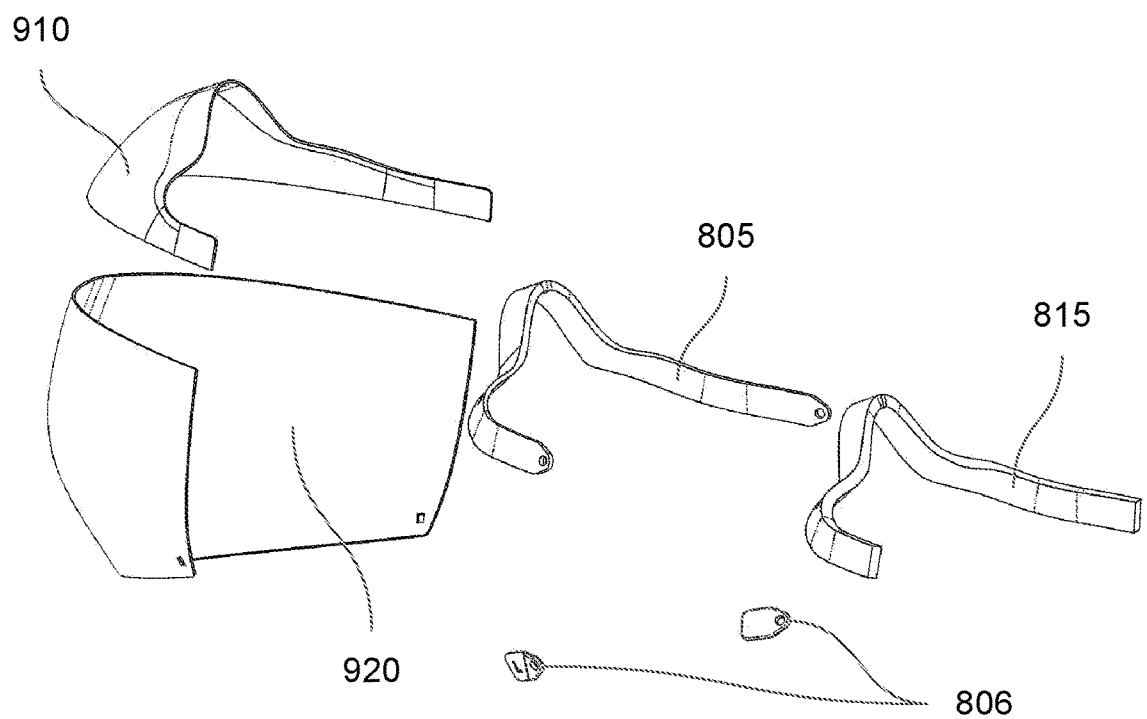

FIG. 1 shows an isometric view of a mask on a headform, with behind-the-head straps
FIG. 2 shows an isometric view of the mask of FIG. 1 without the disposable filter
FIG. 3a shows an exploded view of a mask
FIG. 3b shows a rotated view of the mask of FIG. 3a
FIG. 4a shows a sectional side view of a mask
FIG. 4b shows an exploded view of a mask frame
FIG. 5 shows a side view of the mask of FIG. 1, showing the strap alignment
FIG. 6 shows an isometric view of a mask on a headform, with ear loops
FIG. 7 shows a side view of the mask of FIG. 6, showing the ear loops
FIG. 8a shows a rotated detail view of the strap attachment
FIG. 8b shows a rotated detail view of the ear loop attachment
FIG. 9 shows an isometric view of a simple mask on headform, with behind-the-head straps
FIG. 10a shows a rotated view of a simple mask
FIG. 10b shows an exploded view of the simple mask of FIG. 10a
FIG. 11a shows a rotated view of a different simple mask
FIG. 11b shows an exploded view of the different simple mask of FIG. 11a

| DRAWINGS - REFERENCE NUMERALS |
| --- |
| 100 - Face mask |
| 110 - Headform |
| 200 - Mask frame |
| 210 - Face foam |
| 220 - Frame magnet |
| 230 - Frame lattice |
| 232 - Frame cheek edge |
| 234 - Frame chin edge |
| 236 - Frame side |
| 238 - Frame nose |
| 240 - Frame seal step |
| 242 - Filter pocket |
| 244 - Frame top flange |
| 246 - Frame bottom flange |
| 250 - Strap attachment point |
| 260 - Frame magnet pocket |
| 300 - Disposable filter |
| 310 - Filter ear loops |
| 340 - Filter seal step |
| 344 - Filter top flange |
| 346 - Filter bottom flange |
| 400 - Filter retainer |
| 420 - Retainer magnet |
| 430 - Retainer lattice |
| 440 - Retainer seal step |
| 444 - Retainer top flange |
| 446 - Retainer bottom flange |
| 460 - Retainer magnet pocket |
| 500 - Strap set |
| 510 - Behind-the-head elastic strap |
| 520 - Over-the-head elastic strap |
| 530 - Strap anchor |
| 600 - Ear loop set |
| 610 - Ear loop |
| 620 - Loop anchor |
| 700 - Simple face mask |
| 705 - Simple face mask |
| 800 - Simple mask frame |
| 805 - Simple mask frame |
| 806 - Secondary frame members |
| 810 - Simple mask face foam |
| 815 - Simple mask face foam |
| 850 - Strap attachment point |
| 900 - Fabric mask |
| 910 - Non-air permeable material |
| 920 - Multi-layer fabric with washable filter |

DETAILED DESCRIPTION—PREFERRED EMBODIMENT

The present invention addresses and solves problems related to face masks, particularly where face masks allow air to bypass the filter. The present invention also addresses and solves problems related to using expensive and difficult-to-find replaceable filters, and problems related to attaching a face mask to a user's head.

The present invention solves the above problems by providing a face mask as discussed below. One of ordinary skill in the art will realize that the following discussion is illustrative and intended to describe the preferred embodiments of the present invention and is not intended to limit the present invention to the embodiments discussed. The present invention has numerous applications where a face mask is needed for protecting the user and those around the user from transmission of airborne pathogens. The present invention may be scaled and adapted to many applications and is defined by the claims, which set for the metes and bounds of the present invention.

Referring now to the drawings, and initially to FIGS. 1 through 7, the preferred embodiment of the face mask of the present invention is described. FIG. 1 shows an isometric view of a face mask 100 on a headform 110, with a strap set 500. An ASTM standard surgical mask filter, hereafter referred to as disposable filter 300, is visible through a mask frame lattice 230.

FIG. 2 shows an isometric view of face mask 100 on headform 110 without disposable filter 300. A filter retainer 400 is visible through mask frame lattice 230.

FIG. 3a shows an exploded view of face mask 100. A mask frame 200 is shown with frame lattice 230, a frame side 236, a frame nose 238, a frame magnet 220, a frame magnet pocket 260, and a strap attachment point 250. Disposable filter 300 is shown in an expanded configuration. Filter retainer 400 is shown with a retainer lattice 430. Mask frame lattice 230 and retainer lattice 430 are primarily open to allow air to flow through the lattices. Many particular designs are possible with the lattice, which serves the purpose of retaining the filter. The frame and retainer can have the same lattice or different lattices. Frame side 236 is the area outside of disposable filter 300, and is non-air permeable. Frame nose 238 is also non-air permeable to help prevent exhaled air from reaching a user's glasses. There may be a malleable wire in the area of frame nose 238, either outside the frame, inside the frame, or embedded in the frame. The thickness of the mask frame material can be variable in the frame nose 238 region as well, to adjust the flexible characteristics of that area. Frame magnets 220 are retained in frame magnet pockets 260, there may be one or a plurality of these. Strap attachment points 250 are disposed on the mask frame 200 to receive various strap configurations.

FIG. 3b shows a rotated, exploded view of face mask 100. Mask frame 200 is shown with a face foam 210, a frame cheek edge 232, a frame chin edge 234, a frame top flange 244, a frame bottom flange 246, and a filter pocket 242 set between two frame seal steps 240. Disposable filter 300 is shown with a filter top flange 344, a filter bottom flange 346, two filter seal steps 340, and has two filter ear loops 310 which are not shown. Filter retainer 400 is shown with a retainer top flange 444, a retainer bottom flange 446, two retainer seal steps 440, a retainer magnet 420, and a retainer magnet pocket 460. Face foam 210 is aligned with frame cheek edge 232 and frame chin edge 234, and it sits outside of frame top flange 244 and frame bottom flange 246. Filter pocket 242 allows a disposable filter 300 to be installed into the mask frame 200. Filter top flange 344 is sandwiched between frame top flange 244 and retainer top flange 444. Filter bottom flange 346 is sandwiched between frame bottom flange 246 and retainer bottom flange 446. The frame seal steps 240, filter seal steps 340, and retainer seal steps 440 all align as well to form a seal, held together with frame magnets 220 and retainer magnets 420. Filter ear loops 310 are held between disposable filter 300 and retainer lattice 430. Retainer magnets 420 are retained in retainer magnet pockets 460, there may be one or a plurality of these, but they will generally align with frame magnets 220.

FIG. 4a shows a sectional side view of face mask 100. Mask frame 200 is shown with frame top flange 244, frame bottom flange 246, frame magnet 220, and face foam 210. Disposable filter 300 is shown with filter seal step 340, filter top flange 344, and filter bottom flange 346. Filter retainer 400 is shown with retainer top flange 444, retainer bottom flange 446, and retainer magnet 420. There are raised edges on the top of frame top flange 244 and the bottom of frame bottom flange 246 into which the top and bottom edges of the disposable filter 300 can be aligned, to aid with the installation of the disposable filter 300. These raised edges could be formed by the mask frame 200, by the face foam 210, or a combination of both.

FIG. 4b shows an exploded view of mask frame 200. Mask frame 200 is shown, along with face foam 210, six frame magnets 220, frame magnet pockets 260, and four strap attachment points 250. All six frame magnets 220 fit into six respective frame magnet pockets.

FIG. 5 shows a side view of face mask 100 on headform 110, with strap set 500, showing the strap alignment. Strap set 500 is comprised of a behind-the-head elastic strap 510, an over-the-head elastic strap 520, and four strap anchors 530, two of which are not shown. Strap alignment is such that the strap 510 is pulling straight back along the frame cheek edge 232, and the strap 520 is pulling straight up along frame chin edge 234. This helps to keep the mask in good contact with the face. Strap anchors 530 have a feature that engages with the strap attachment point 250 on the mask frame 200. This allows the straps to be easily interchanged. Straps 510 and 520 could be adjusted by strap anchor 530, or they could have separate adjustments. They could have buckles or other methods of quick detachment on their straps or they could be thin and flat along their entire length. A user could easily switch straps 510 and 520 such that strap 510 is connected to the lower strap attachment point 250, and the 520 strap is connected to the upper strap attachment point 250.

FIG. 6 shows an isometric view of face mask 100 on headform 110, with an ear loop set 600. Ear loop set 600 is comprised of an ear loop 610 and two loop anchors 620. There are two ear loop sets 600 for one face mask 100, one set is shown in this figure, the other set is not shown. Ear loop 610 could be adjusted by loop anchors 620, or it could have separate adjustments.

FIG. 7 shows a side view of face mask 100 on headform 110, with ear loop set 600. Loop alignment is shown with the loop anchor 620 connected to the end of ear loop 610 that is going over the ear is connected to the upper strap attachment point 250, and the loop anchor 620 that is connected to the end of ear loop 610 going under the ear is connected to the lower strap attachment point 250. However, the loop anchors could be switched on the strap attachment points 250 so the loop alignment is similar to the strap alignment shown in FIG. 5.

FIG. 8a shows a detail view looking down on the user's left side of mask frame 200 showing strap anchor 530 use and operation. One strap anchor 530 is shown installed in lower strap attachment point 250 on the right. Another strap anchor 530 is shown uninstalled, and with behind-the-head elastic strap 510 threaded through it. Uninstalled strap anchor 530 could be pressed into exposed upper strap attachment point 250 on the left.

FIG. 8b shows a detail view looking down on the user's left side of mask frame 200 showing loop anchor 620 use and operation. One loop anchor 620 is shown installed in lower strap attachment point 250 on the right, and with ear loop 610 threaded through it. Another loop anchor 620 is shown uninstalled, and with ear loop 610 threaded through it. Uninstalled loop anchor 620 could be pressed into exposed upper strap attachment point 250 on the left.

Operation

A user of this face mask would first install the user's preferred strap system into the strap attachment points 250 on mask frame 200. Options include strap set 500, ear loop set 600, or various other options. To operate the interchangeable strap system, a user would start with a pre-threaded strap system, meaning the straps 510 and 520 are already installed into the strap anchors 530. A strap anchor 530 is simply pressed through strap attachment point 250 of mask frame 200, then repeated until all the strap anchors are attached to the mask. To remove, a user peels each strap anchor 530 out of each strap attachment point 250. The installation and removal of an ear loop set 600 is similar. This method of attaching an object to a TPU frame has been used with much success in ski goggles.

A user would acquire an ASTM standard surgical face mask, aka disposable filter 300, expand the pleats, and make sure filter ear loops 310 are laying towards the inside of disposable filter 300. A user would then remove filter retainer 400 from the inside of face mask 100, align the top edge of disposable filter 300, with the top edge of frame top flange 244, align the bottom edge of disposable filter 300 with the bottom edge of frame bottom flange 246, then press the center of disposable filter 300 into filter pocket 242. After ensuring filter ear loops 310 are laying against the inside of disposable filter 300, a user would then replace filter retainer 400, allowing the magnets to align filter retainer 400 into filter pocket 242 of mask frame 200.

A user can then place the mask on the user's face using the strap system selected above, allowing face foam 210 to conform to the user's face, and adjusting the strap system to achieve the optimal pressure.

If air is sensed escaping through the face seal, or if there is too much pressure on the face, the strap system can be adjusted accordingly or interchanged for a different strap system.

DETAILED DESCRIPTION—ADDITIONAL EMBODIMENTS

FIG. 9 shows an isometric view of a simple face mask 700 on headform 110, with strap set 500, and a fabric mask 900. As detailed above, the strap set 500 is interchangeable, so ear loop strap 600 could be installed, or another retention system could be installed.

FIG. 10a shows a rotated view of simple face mask 700, showing a simple mask frame 800, a simple mask face foam 810, fabric mask 900, which is comprised of a non-air permeable material 910 and a multi-layer fabric with washable filter 920. A strap attachment point 850 is shown, which is similar to strap attachment point 250 described above.

FIG. 10b shows an exploded view of simple face mask 700, showing simple mask frame 800, simple mask face foam 810, non-air permeable material 910, and multi-layer fabric with washable filter 920.

FIG. 11a shows a rotated view of a different simple face mask 705, showing a simple mask frame 805, a simple mask face foam 815, two smaller secondary frame members 806, fabric mask 900, which is comprised of non-air permeable material 910 and multi-layer fabric with washable filter 920. Strap attachment point 850 is shown, which is similar to strap attachment point 250 described above. Secondary frame members 806 may or may not be required depending on the shape of the mask. For instance, if the mask tapered on the side to a single point, only one strap attachment point per side could be used.

FIG. 11b shows an exploded view of simple face mask 705, showing simple mask frame 805, two smaller secondary frame members 806, simple mask face foam 815, non-air permeable material 910, and multi-layer fabric with washable filter 920.

Advantages

From the description above, a number of advantages of my face mask with improved face seal become evident:
 a) By using ski goggle face fit technology, a face mask can be designed with a good, comfortable face seal. This prevents air from escaping past the user's cheeks, so this will prevent a user's glasses from fogging.
 b) By using ski goggle lens interchange technology, a face mask can have a quick-release disposable filter that seals well against the frame to prevent air leakage around the filter.
 c) By using an ASTM standard surgical mask as a filter, and without needing any modifications to the filter, a user can very easily find effective, inexpensive replacement filters.
 d) Interchangeable, adjustable strap systems allow a user to get a perfect fit, with their face mask, and then the face mask will always have the same fit. The user does not need to adjust the straps to switch out the filter.
 e) By adapting similar attributes to a smaller face mask with a washable filter, a user could choose a smaller, more portable face mask without an easily replaceable filter.

Conclusion, Ramifications, and Scope

Accordingly, the reader will see that the face mask with improved face seal of this invention provides superior protection from transmission of airborne pathogens between the user and those surrounding the user. By combining an easily replaceable, inexpensive, readily available filter with a superior face seal, a user can feel confident in the protection provided by using this face mask.

Although the description above contains many specificities, these should not be construed as limiting the scope of the invention but merely providing illustrations of some of the presently preferred embodiments of this invention. For example:
 a) A filter could be housed in a removably attached secondary frame, to allow the user to remove the filter portion for eating or speaking, for a moment when the filtration is not required, or for changing out the filter.
 b) This secondary frame could be attached with magnets.
 c) This secondary frame could have a mechanical retention system.
 d) This secondary frame could have magnets plus a secondary mechanical retention system.
 e) The filter retainer described in the embodiment section could be built into the mask frame.
 f) Other face foams could be explored other than closed cell. Open cell face foams with impermeable barriers built in could be used.
 g) Multiple layers of face foam could be used. These different layers could be of different densities and/or foam types.

h) Face foams can be heat-pressed to 3D form them.
i) There are other frame configurations that could be developed.

Thus, the scope of the invention should be determined by the appended claims and their legal equivalents, rather than by the examples given.

I claim:

1. A device with means for filtering air that a user breathes, comprising:
   a) a first frame, comprised of a flexible non-air permeable material, having an inner surface and an outer surface, and having a large area in the middle of the first frame to allow air to flow through,
   b) a face seal, having an inner surface and an outer surface, with the outer surface attached to the inner surface of the first frame, said face seal fully circumferentially surrounding the user's mouth and nose, and forming a seal against the user's face with the inner surface,
   c) a filter pocket in the middle of the first frame, sized to receive a standard surgical mask as a filter,
   d) a second frame, comprised of a flexible material, having a large area in the middle of the second frame to allow air to flow through, which is removably attached to the first frame, and secures the filter in place, and
   e) a strap system, removably attached to the first frame, to hold the first frame onto a user's face,
      whereby the device forms a seal around the user's face, defining an isolated air volume around the user's nose and mouth, separated from the outside environment, only allowing air to pass between the isolated volume and the outside environment through the filter.

2. The device according to claim 1, wherein the first frame and second frame are composed of a thermoplastic urethane or silicone material.

3. The device according to claim 1, wherein the face seal is composed of a foam material.

4. The device according to claim 1, wherein the second frame is attached to the first frame via one or more magnets.

5. The device according to claim 1, wherein there is a malleable material attached or embedded in the nose region of the first frame.

6. The device according to claim 5, wherein the malleable material is a metal wire.

7. The device according to claim 1, wherein the nose region of the first frame has varying thicknesses to adjust the stiffness in a particular area.

8. The device according to claim 1, wherein the strap system is comprised of straps that go behind a user's head.

9. The device according to claim 1, wherein the strap system is comprised of ear loops that go behind a user's ear.

10. A method of filtering the air that a user breathes, comprising:
    a) a first frame, comprised of a thermoplastic urethane or silicone material, having an inner and an outer surface, and having a large area in the middle of the frame to allow air to flow through,
    b) a face seal, and attached to the inner surface of the first frame, said face seal fully circumferentially surrounding the user's mouth and nose, and forming a seal against the user's face,
    c) a filter pocket in the middle of the first frame, sized to receive a standard surgical mask as a filter,
    d) a second frame, comprised of a thermoplastic urethane or silicone material, which is removably attached to the first frame, and secures the filter in place, and
    e) a strap system, removably attached to the first frame, to hold the first frame onto a user's face,
       whereby a seal is formed around the user's face, defining an isolated air volume around the user's nose and mouth, separated from the outside environment, only allowing air to pass between the isolated volume and the outside environment through the filter.

11. The method according to claim 10, wherein the second frame is attached to the first frame via a plurality of magnets.

12. A device with means for filtering air that a user breathes, comprising:
    a) a frame, comprised of a flexible material, having an inner and an outer surface, a top and bottom surface, and two ends, whereas the frame is contoured to sit on a user's face across the bridge of the nose and the cheeks, with the inner surface facing a user's cheek, the top surface is facing a user's eyes, the bottom surface is substantially parallel to the top surface, and the ends are closer to a user's ears than a user's nose,
    b) a face seal, having an inner and outer surface, a top and bottom surface, and two ends, whereas the outer surface is attached to the inner surface of the frame, the inner surface contacts a user's cheek, and the top surface is substantially aligned with the top surface of the frame,
    c) an upper fabric, comprised of a non-air permeable material, having an inner surface, an outer surface, a top edge, a bottom edge, and two side edges,
       whereas the inner surface is attached to the outer surface of the frame, the top edge is substantially aligned with the top surface of the frame, and the bottom edge extends beyond the bottom surface of the frame,
    d) a lower fabric, comprised of a multi-layer fabric including a washable filtration layer, having a top edge, a bottom edge, and two side edges, whereas the top edge is attached to the bottom edge of the upper fabric, and the bottom edge extends below the user's chin, and
    e) a strap system, removably attached to the frame, to hold the frame onto a user's face,
       whereby a volume of air around the user's nose and mouth is substantially separated from the outside environment, and a minimal amount of air is allowed to escape this air volume past the user's cheeks.

13. The device according to claim 12, wherein the frame extends below the ear at the end of the ends, and there are a plurality of attachment points for the strap system at each of the ends.

14. The device according to claim 12, wherein a separate, much smaller frame member is attached to the lower fabric below the frame near each end, not being attached to the frame, and has an attachment point for the strap system.

15. The device according to claim 12, wherein the first frame and second frame are composed of a thermoplastic urethane or silicone material.

16. The device according to claim 12, wherein the face seal is composed of a foam material.

17. The device according to claim 12, wherein there is a malleable material attached or embedded in the nose region of the first frame.

18. The device according to claim 17, wherein the malleable material is a metal wire.

19. The device according to claim 12, wherein the nose region of the first frame has varying thicknesses to adjust the stiffness in a particular area.

20. The device according to claim 12, wherein the device is small and can fold up smaller than a user's fist.

\* \* \* \* \*